C. I. AGGERBECK.
DETACHING DEVICE FOR LIVE STOCK.
APPLICATION FILED JUNE 23, 1909.
943,641.
Patented Dec. 21, 1909.
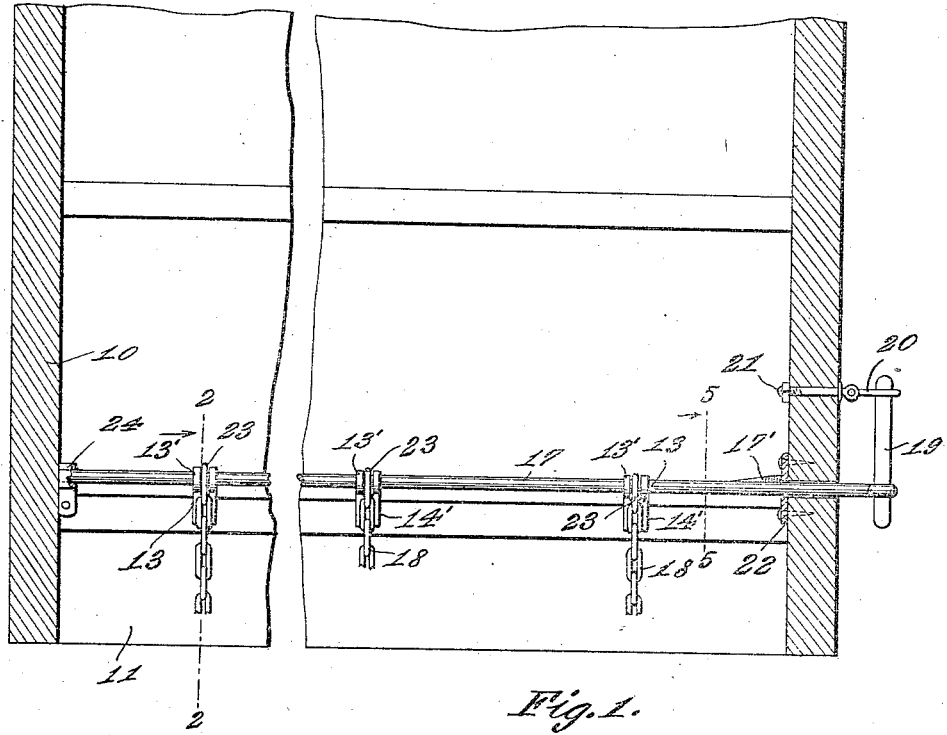
Fig. 1.
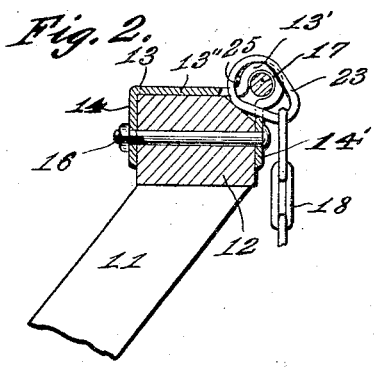
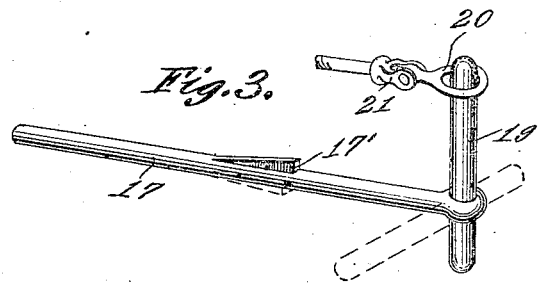
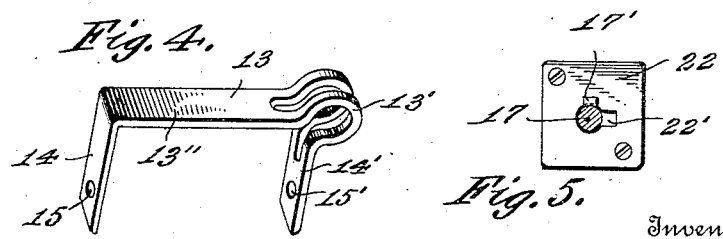
Witnesses
E. Larson
S. E. Dodge
Inventor
C. I. Aggerbeck,
By Beeler & Robb
Attorneys

UNITED STATES PATENT OFFICE.

CHRISTIAN IWAN AGGERBECK, OF WASHINGTON, DISTRICT OF COLUMBIA.

DETACHING DEVICE FOR LIVE STOCK.

943,641. Specification of Letters Patent. Patented Dec. 21, 1909.

Application filed June 23, 1909. Serial No. 503,918.

*To all whom it may concern:*

Be it known that I, CHRISTIAN IWAN AGGERBECK, a subject of the King of Denmark, residing at Washington, in the District of Columbia, have invented certain new and useful Improvements in Detaching Devices for Live Stock, of which the following is a specification.

This invention relates to the care of live stock, and has particular reference to mechanism for detachably tying or securing horses, cattle or the like.

The prime object of the invention is to provide a device of the above mentioned character whereby it will be possible to quickly release all of the animals secured thereby in cases of emergency, such as fires or the like.

For a full understanding of the invention, including its construction and characteristic advantages, reference is to be had to the following detailed description, and the accompanying drawings, in which—

Figure 1, is an elevation of the device applied to a building construction, the latter being in section; Fig. 2, is a vertical transverse sectional detail substantially on line 2—2 of Fig. 1; Fig. 3, is a detail perspective view of the outer end of the locking bar and means for securing the same in place; Fig. 4, is a detail perspective of one of the securing loop hasps detached, and Fig. 5, is a cross sectional detail substantially on the line 5—5 of Fig. 1.

Throughout the following description and on the several figures of the drawing similar parts are referred to by like reference characters.

Referring to the figures of the drawings, at 10 is indicated in a conventional way a fragment of a barn or stable in which a number of animals are to be housed and tied by the mechanism hereinafter described. As is customary a manger 11 is provided adjacent to which the securing devices are placed.

Preferably connected to the top rail 12 of the manger are a series of securing loops or hasps 13 each of which is formed in the peculiar manner as indicated in Fig. 4, being bent up intermediate of its ends and formed into a loop or eye 13'. Said hasp 13 also includes a top or horizontal member 13'' and a pair of downwardly projecting parallel legs 14 and 14' having holes 15 and 15' in alinement with each other. Said parallel legs are designed to embrace the manger rail 12, and a securing bolt 16 is passed through said holes securing the hasps permanently to the rail. The eye 13' projects upwardly and outwardly from the said rail, and all of said eyes of the series of loops 13 are in alinement with one another.

A single solid securing rod 17 passes through all of the said alined eyes for the purpose of securing the hitching devices, shown in the forms of chains 18, to the respective hasps. The rod 17 is preferably introduced into and through said eyes from the outside of the building, the outer end of the rod being provided with an operating handle whereby it is operated, and also prevented from rotation when in locked position. The handle is embraced by a loop 20 which is shown as pivoted or hinged to a bolt 21 connected permanently to the building wall. When it is desired to remove the rod 17 the loop 20 is thrown or driven upwardly to detach it from the end of the handle 19 whereupon the handle and rod may be given a partial rotation in order to release the catch 17' from a locking plate 22 located preferably on the inner face of said wall and provided with a key-hole slot 22'. The catch 17' when the rod is introduced into place passes through said slot and upon rotation of the bar the said hook coöperates with the unslotted portion of the plate 22 but prevents withdrawal of the bar except on rotation thereof as above set forth.

Each of the chains 18 terminates in a ring 23 which is introduced between the two parts of the eye 13' of the hasp and through which said rod 17 passes to make a positive fastening for said chain.

It is to be understood that the usual tying and untying of the animals is accomplished at their heads in the usual manner, but with the chains 18 under ordinary circumstances remaining connected to the hasps and rod as above set forth.

I am aware that it is not broadly new to provide detachable fastening devices of this general type, but such devices as heretofore proposed are usually comparatively complicated and hard to install. Furthermore this device is not only simple in construction but easy and sure of operation. In the event of a fire, for instance, a person approaching the stable may by a simple operation loosen the handle 19 from the loop 20 and after giving the handle and rod a partial rotation the rod may be withdrawn bodily from all of the hasps 13 releasing all of the animals secured thereby, leaving them free to escape from danger. The inner end of the rod 17 should preferably be supported by a loop or keeper 24 to prevent bending of the rod by the animals.

The peculiar form of the hasps 13 affords a simple and effective means for securing the chains and rings thereto. As indicated in Fig. 2 each ring 23 may be placed in the eye 13' the upper portion or end of the ring overlapping the structure of the eye sufficiently far to permit a small stick or the like 25 to pass through the ring above the eye temporarily holding the ring in place and out of the path of the bar 17. One person, therefore, may place all of said rings in their places, setting them as indicated in Fig. 2 and thereafter introduce the bar 17 into place from the outside of the building. The sticks 25 may or may not be removed thereafter. It will be understood of course that the animals will not be in their stalls at this time.

Having thus set forth the preferred embodiment of the invention, what I claim as new is:

In combination with a stable including a wall and a manger rail, a series of hasps secured in alinement to said rail, a series of chains and rings coöperating with the respective hasps, a solid securing bar introduced through said wall from the outside into and through all of said hasps and rings from one end of the series to the other, a plate having a key-hole slot secured on the inner face of said wall, said rod having a catch coöperating with said plate to prevent outward displacement of the bar, a handle permanently connected to the outer end of said bar for manipulation thereof, and locking means coöperating with the said handle to prevent rotation of the bar.

In testimony whereof I affix my signature in presence of two witnesses.

CHRISTIAN IWAN AGGERBECK.

Witnesses:
GEO. L. BEELER,
ARTHUR L. BRYANT.